(12) United States Patent
Bjorstrom et al.

(10) Patent No.: US 8,717,713 B1
(45) Date of Patent: May 6, 2014

(54) DIFFERENTIALLY DRIVEN PIEZOELECTRIC TRANSDUCERS FOR DUAL STAGE ACTUATED DISK DRIVE HEAD SUSPENSION

(75) Inventors: Jacob D. Bjorstrom, Hutchinson, MN (US); Zachary D. Pokornowski, Cokato, MN (US); Ryan N. Ruzicka, Dassel, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 76 days.

(21) Appl. No.: 13/279,814

(22) Filed: Oct. 24, 2011

Related U.S. Application Data (60) Provisional application No. 61/406,276, filed on Oct. 25, 2010.

(51) Int. Cl.
 *G11B 5/58* (2006.01)
 *G11B 21/20* (2006.01)
(52) U.S. Cl.
 USPC .................. 360/294.4; 360/244.8; 360/245.9
(58) Field of Classification Search
 USPC ........... 360/245.8, 245.9, 294.4, 244.2, 244.8
 See application file for complete search history.

(56) References Cited

U.S. PATENT DOCUMENTS

| | | | | |
|---|---|---|---|---|
| 7,218,481 B1 * | 5/2007 | Bennin et al. | ............. | 360/294.4 |
| 7,440,236 B1 * | 10/2008 | Bennin et al. | ............. | 360/294.4 |
| 7,459,835 B1 * | 12/2008 | Mei et al. | ..................... | 310/330 |
| 8,254,065 B2 * | 8/2012 | Inoue et al. | ................ | 360/294.4 |
| 8,416,536 B2 * | 4/2013 | Fuchino et al. | ............ | 360/294.4 |
| 8,570,688 B1 * | 10/2013 | Hahn et al. | ................ | 360/294.4 |
| 8,593,764 B1 * | 11/2013 | Tian et al. | .................. | 360/245.4 |
| 2001/0038515 A1 * | 11/2001 | Koganezawa et al. | ..... | 360/294.4 |

* cited by examiner

*Primary Examiner* — Jefferson Evans
(74) *Attorney, Agent, or Firm* — Faegre Baker Daniels LLP (57) ABSTRACT

An improved dual stage actuated disk drive head suspension in accordance with one embodiment of the invention includes a mounting/base plate having first and second portions connected by a linkage, one or more PZT motors and a flexure having one or more pairs of differential drive signal traces. Each PZT motor has a pair of electrodes. Non-conductive adhesive secures each PZT motor to the first and second portions of the mounting/base plate with the electrodes of each motor being electrically isolated from the mounting/base plate. Each pair of drive signal traces is electrically connected to one of the pair of PZT motor electrodes to couple differential electrical drive signals to the PZT motor. Each PZT motor drives the first and second portions of the mounting/base plate with respect to one another in response to the drive signals.

20 Claims, 10 Drawing Sheets

DIFFERENTIALLY DRIVEN PIEZOELECTRIC TRANSDUCERS FOR DUAL STAGE ACTUATED DISK DRIVE HEAD SUSPENSION

REFERENCE TO RELATED APPLICATION

This application claims the benefit of U.S. Provisional Patent Application Ser. No. 61/406,276, filed on Oct. 25, 2010 and entitled Differentially Driven Piezoelectric Transducers (PZTs) For Dual Stage Actuated Disk Drive Head Suspension, which is incorporated herein in its entirety for all purposes.

TECHNICAL FIELD

The invention relates generally to disk drive head suspensions. In particular, the invention is a microactuated or dual stage actuated (DSA) head suspension component.

BACKGROUND OF THE INVENTION

Microactuated or dual stage actuated (DSA) disk drive head suspensions and associated components are generally known. Suspensions and components of these types are, for example, shown in the Bennin U.S. Pat. No. 7,440,236 and the Fuchino U.S. Patent Application Publication No. 2010/0177445. There remains, however, a continuing need for improved dual stage actuated disk drive suspensions and components.

SUMMARY OF THE INVENTION

The invention is an improved dual stage actuated disk drive head suspension. One embodiment of the invention includes first and second portions connected by a linkage, at least one PZT motor having a pair of electrodes, and a flexure having at least one pair of differential drive signal traces. The motor is mounted to the first and second portions. The drive signal traces on the flexure are electrically connected to the pair of electrodes on the PZT motor to couple differential electrical drive signals to the PZT motor. The PZT motor drives the first and second portions of the suspension with respect to one another in response to the drive signals. In another embodiment of the invention the PZT motors are mounted to the first and second portions by non-conductive adhesive. In yet another embodiment of the invention each PZT motor includes a pair of terminals. Each terminal is connected to one of the motor electrodes, and the pair of terminals are on the same side of the motor. In still another embodiment of the invention the terminals on each PZT motor are on the side of the motor facing the flexure and drive signal traces.

DETAILED DESCRIPTION

Figure 1:
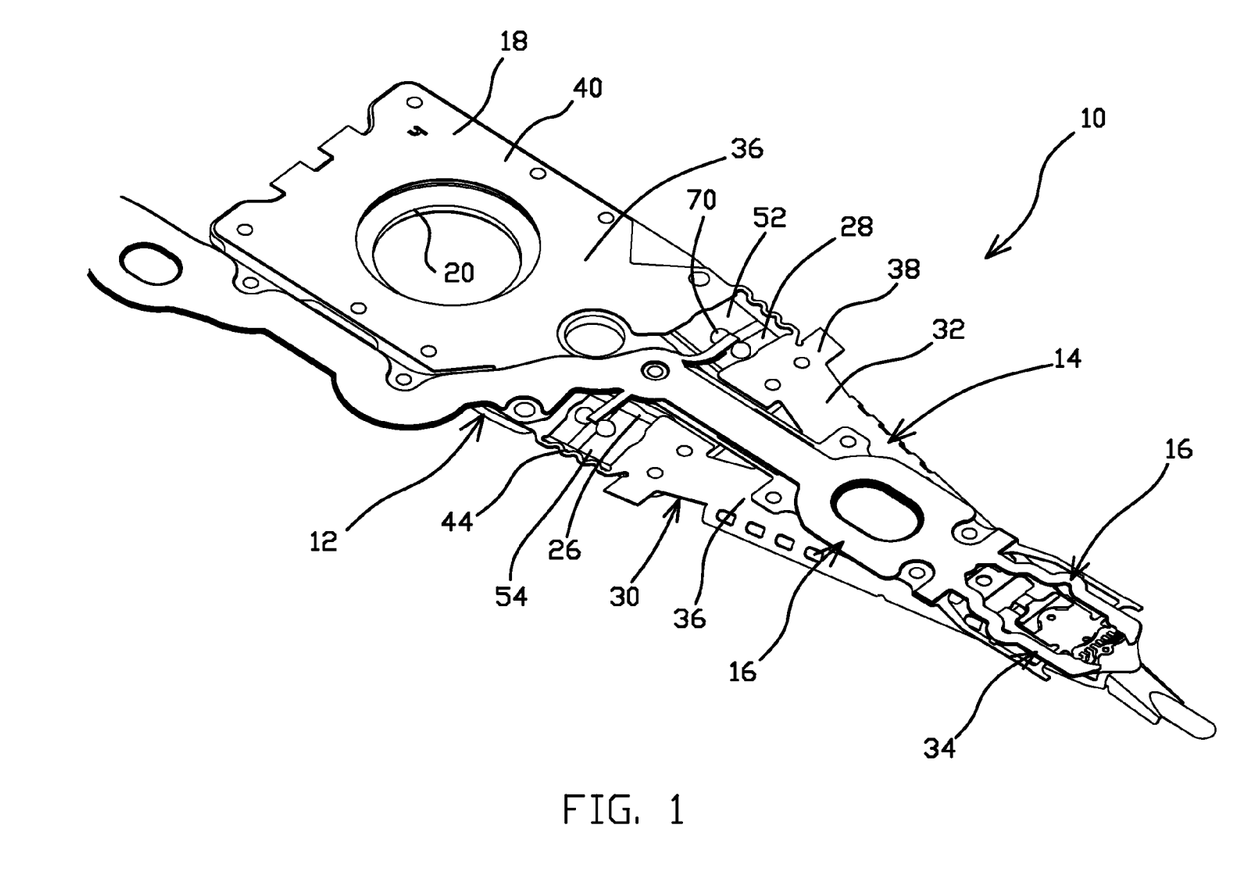
FIGS. 1 and 2 are flexure-side views of a suspension in accordance with one embodiment of the invention.
Figure 2:
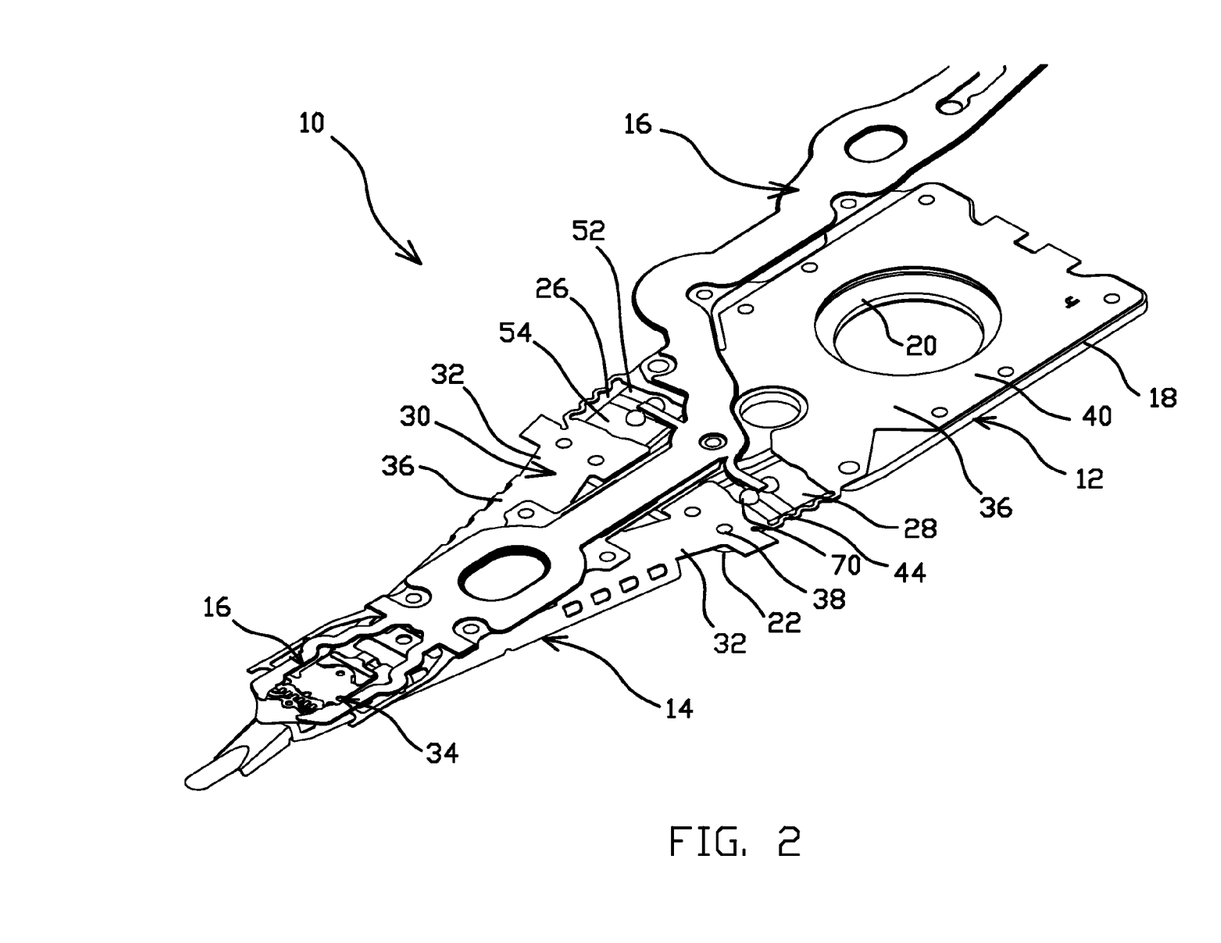
Figure 3:
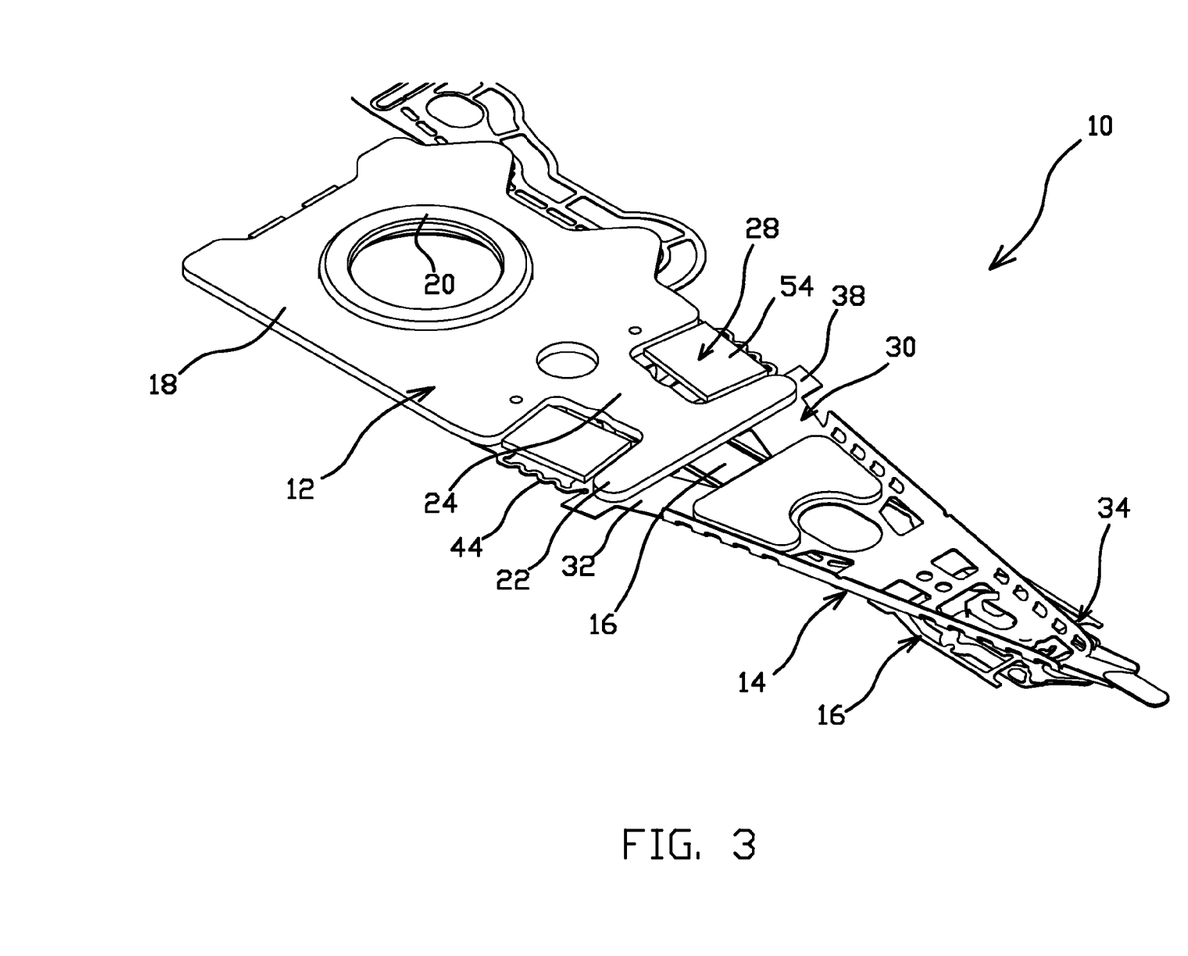
FIG. 3 is a mounting/base plate-side view of the suspension shown in FIGS. 1 and 2.

The invention is a dual stage actuated (DSA) disk drive head suspension and associated components having a one or more differentially driven piezoelectric transducers (PZTs). FIGS. 1 and 2 are flexure-side views of a suspension 10 in accordance with one embodiment of the invention. FIG. 3 is a mounting/base plate-side view of the suspension 10 shown in FIGS. 1 and 2, illustrating the side of the suspension opposite that shown in FIGS. 1 and 2. As shown, the suspension 10 includes a mounting/base plate 12, a load beam 14 and a flexure 16. The mounting/base plate 12 has a proximal end 18 (with a boss tower 20 in the illustrated embodiment), a distal end 22 and a linkage 24 between the proximal and distal ends. Also located between the proximal and distal ends of the mounting/base plate 12 are one or more openings 26 (two are shown in the illustrated embodiment). A PZT motor 28 is mounted to the suspension 10 in each of the openings 26. The load beam 14 is connected to the distal end 22 of the mounting/base plate 12 by a hinge or spring region 30. In the illustrated embodiment the spring region 30 has two laterally-spaced arms 32. The flexure 16 has a gimbal region 34 that is located at the distal end of the load beam 14. In the illustrated embodiment of suspension 10, much of the load beam 14 and the spring region 30 are formed from layer of spring metal such as stainless steel 36. Portions 38 of this stainless steel layer 36 extending proximally from the arms 32 of the spring region 30 are mounted (e.g., by welding) to the distal end 22 of the mounting/base plate 12. A proximal portion 40 of the stainless steel layer 36 overlays the mounting/base plate 12 and is connected to the portions 38 of the stainless steel layer mounted to the distal end 22 of the mounting/base plate by encapsulant barriers 44 extending across the PZT openings 26 in the illustrated embodiment. In this embodiment the proximal portion 40, encapsulant barrier 44, spring region 30 and load beam 14 are all formed from a unitary piece of stainless steel 36 (these components are formed from separate pieces of stainless steel in other embodiments). The linkage 24 enables the distal end 22 of the mounting/base plate 12 (and therefore the load beam 14, flexure 16 and gimbal region 34) to rotate or move (generally in the plane of the mounting/base plate) with respect to the proximal end 18 of the mounting/base plate when driven by the PZT motors 28. With the exception of the DSA structure described in greater detail below, the components of the suspension 10 can be of conventional or otherwise known design.

Figure 4:
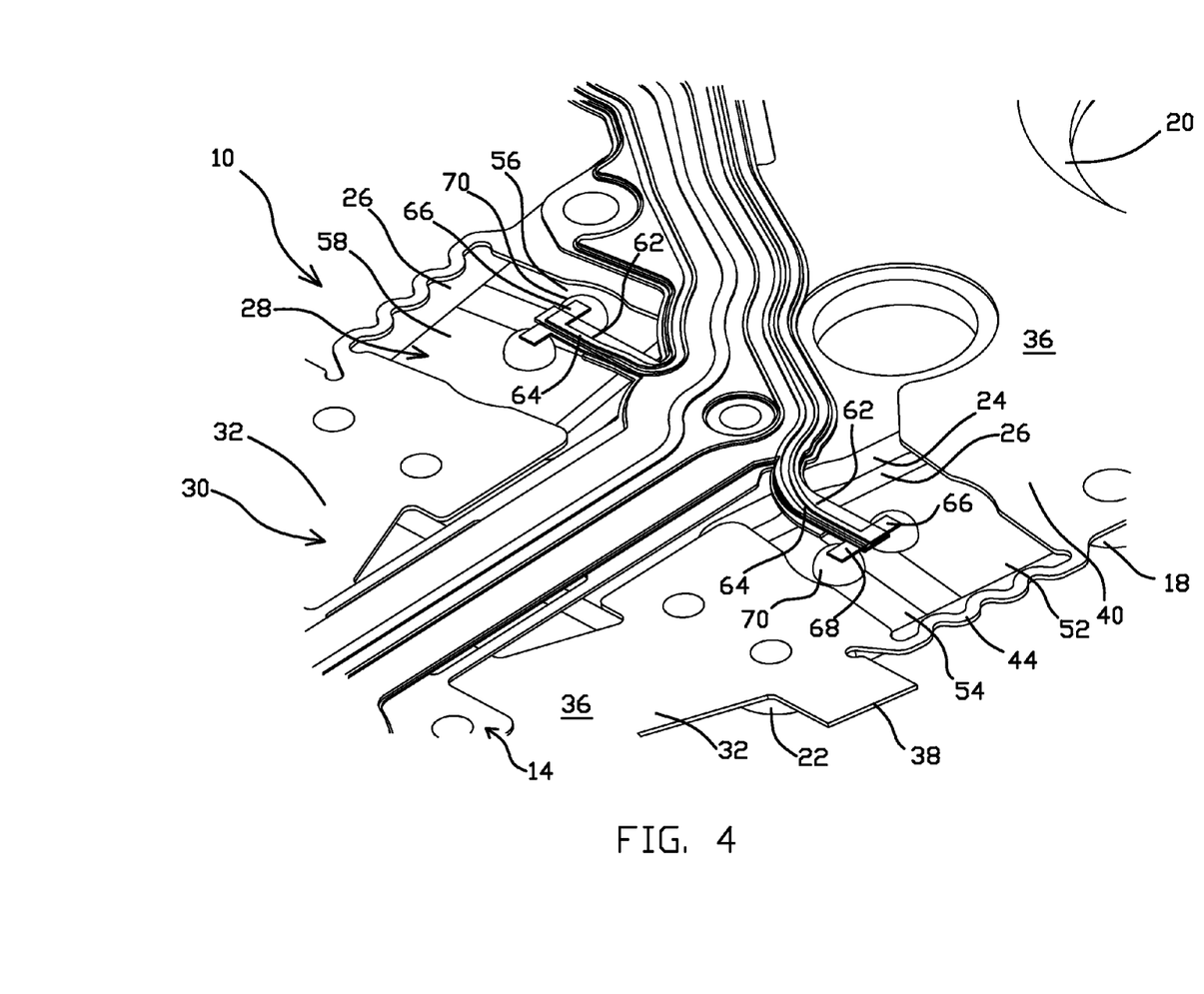
FIG. 4 is a detailed illustration of a portion of the suspension shown in FIGS. 1-3.
Figure 5:
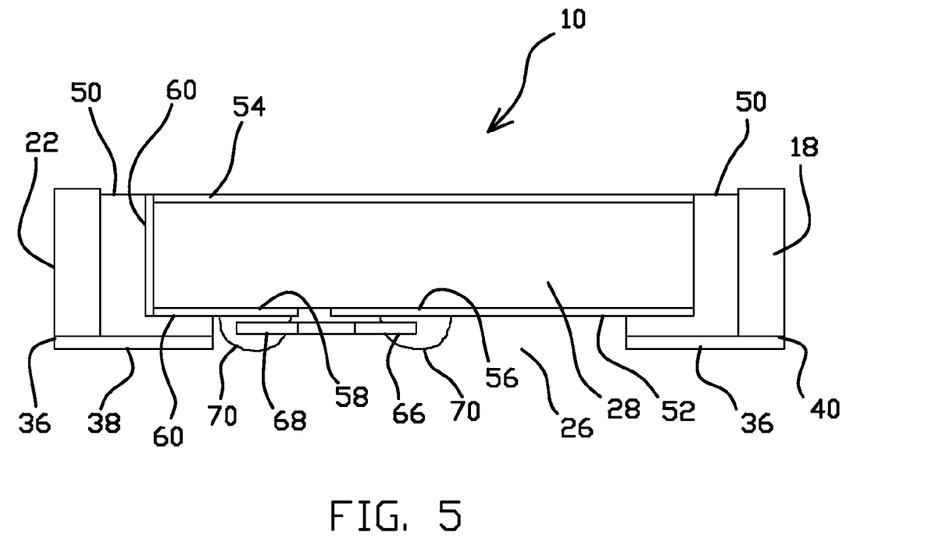
FIG. 5 is a side edge view of the dual stage actuated (DSA) structure of the suspension shown in FIGS. 1-4.

FIG. 4 is a detailed illustration of the portion of the suspension 10 shown in FIGS. 1-3, showing the differentially driven dual stage actuated (DSA) structure from the flexure side of the suspension. FIG. 5 is a side edge view of the DSA structure. A proximal end of each PZT motor 28 is mounted to the proximal end 18 of the mounting/base plate 12 and a distal end of each PZT motor is mounted to a distal end 22 of the mounting/base plate. In particular and as shown in FIGS. 4 and 5, in the illustrated embodiment the proximal end of each PZT motor 28 is mounted to and supported by a portion or shelf of the proximal portion 40 of the stainless steel layer 36 that extends into the PZT opening 26 from the proximal end 18 of the mounting/base plate 12. The distal end of each PZT motor 28 is mounted to and supported by a portion or shelf of the portion 38 of the stainless steel layer 36 that extend proximally into the PZT openings 26 from the distal end 22 of the mounting/base plate 12. Non-conductive epoxy 50 is used to adhesively mount the ends of the PZT motors 28 to the mounting/base plate 12 and shelves of stainless steel layer 36.

Each PZT motor 28 has first and second electrodes 52 and 54, respectively. To enable the PZT motors 28 to be driven differentially, both of the two electrodes 52 and 54 are electrically isolated from a ground potential contact (e.g., neither of the electrodes is electrically connected to the mounting/base plate 12 or the stainless steel layer 36). In the embodiment shown in FIGS. 4 and 5 the non-conductive epoxy used to mount the PZT motors 28 to the mounting/base plate 12 and stainless steel layer 36 electrically isolates the electrodes 52 and 54 from mounting/base plate and stainless steel layer.

As also shown in FIGS. 4 and 5, to differentially pole or drive the PZT motors 28, both electrodes 52 and 54 are connected to receive electrical PZT drive signals. In the illustrated embodiment, the PZT motors 28 have electrodes 52 and 54 coupled to terminals 56 and 58, respectively, that are located on the same side of the PZT motors. In the particular embodiment shown in FIGS. 4 and 5 the terminals 56 and 58 are located on the side of the PZT motors 28 facing the flexure 16. As perhaps best shown in FIG. 5, the electrode 54 is connected to its terminal 58 by a conductive plating 60 that extends from the electrode 54, around an edge of the PZT motor to the terminal 58. A pair of motor drive signal traces 62 and 64 extend from the flexure and terminate at terminals 66 and 68, respectively, located adjacent to the terminals 56 and 58 of the PZT motors 28. The terminals 66 and 68 of the motor drive signal traces 62 and 64 are electrically connected to the PZT motor terminals 56 and 58, respectively (e.g., by solder contacts 70 in the illustrated embodiment). The differential drive signal traces 62 and 64 are coupled to DSA drive signal terminals (not shown) on the proximal end of the flexure 16. In other embodiments (not shown) other materials or structures such as conductive epoxy or conductive film can be used to connect the trace terminals 66 and 68 to the PZT motor terminals 56 and 58.

The illustrated structure, including the wrapping of the plating (e.g., gold) from the electrode 54 (e.g., the top electrode in FIG. 5) on one side of the PZT motor 28 to the terminal 58 on the other side of the motor (e.g., the bottom electrode in FIG. 5), enables the efficient interconnection of the differential motor drive signal traces to the PZT motor electrodes. Other embodiments (not shown) include other structures for coupling the differential motor drive signals to the PZT motors. For example, a portion of the bottom electrode can be not plated to reduce or eliminate the possibility of shorting the top electrode to the bottom electrode. The electrode with the wrapped contact can be positioned to minimize the volume of unpoled PZT. Manufacturing efficiencies may be obtained if the side of the PZT motor having the selectively plated electrode is on the surface of the wafer tape during assembly.

The invention offers important advantages. In particular, it allows the PZT motors to be driven differentially. For example, a positive voltage can be applied on one side of the motor and a negative voltage on the other, allowing the total effective voltage across the PZT to be double the maximum rail voltage. Greater stroke can thereby be obtained from a given size PZT motor. By way of example, prototypes of the invention had an average stroke of 23 nm/V, compared to a stroke of 19 nm/V in a similar suspension with the same size PZT motor that was not differentially driven. Suspensions in accordance with the invention can have reduced effective size PZT motors yet still provide higher stroke lengths.

Figure 6:
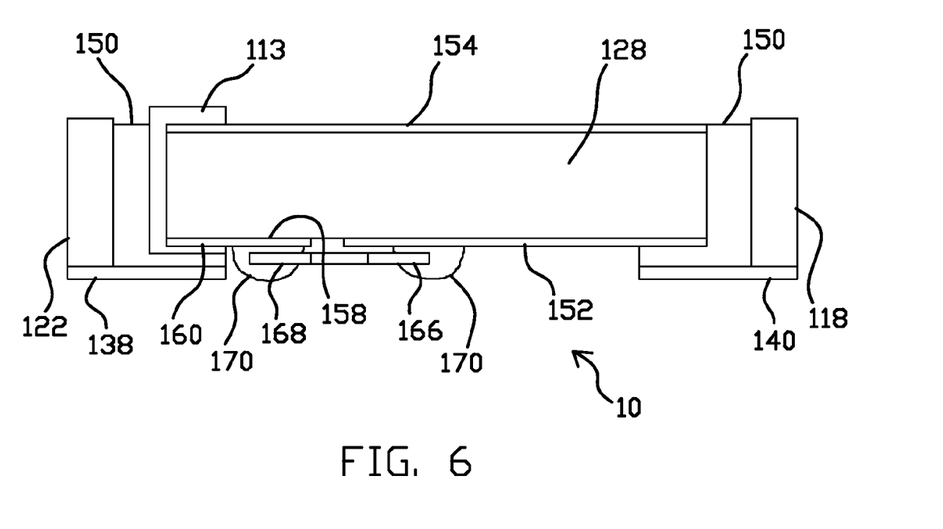
FIG. 6 is a detailed side edge view of a DSA structure of a suspension in accordance with another embodiment of the invention.
Figure 7:
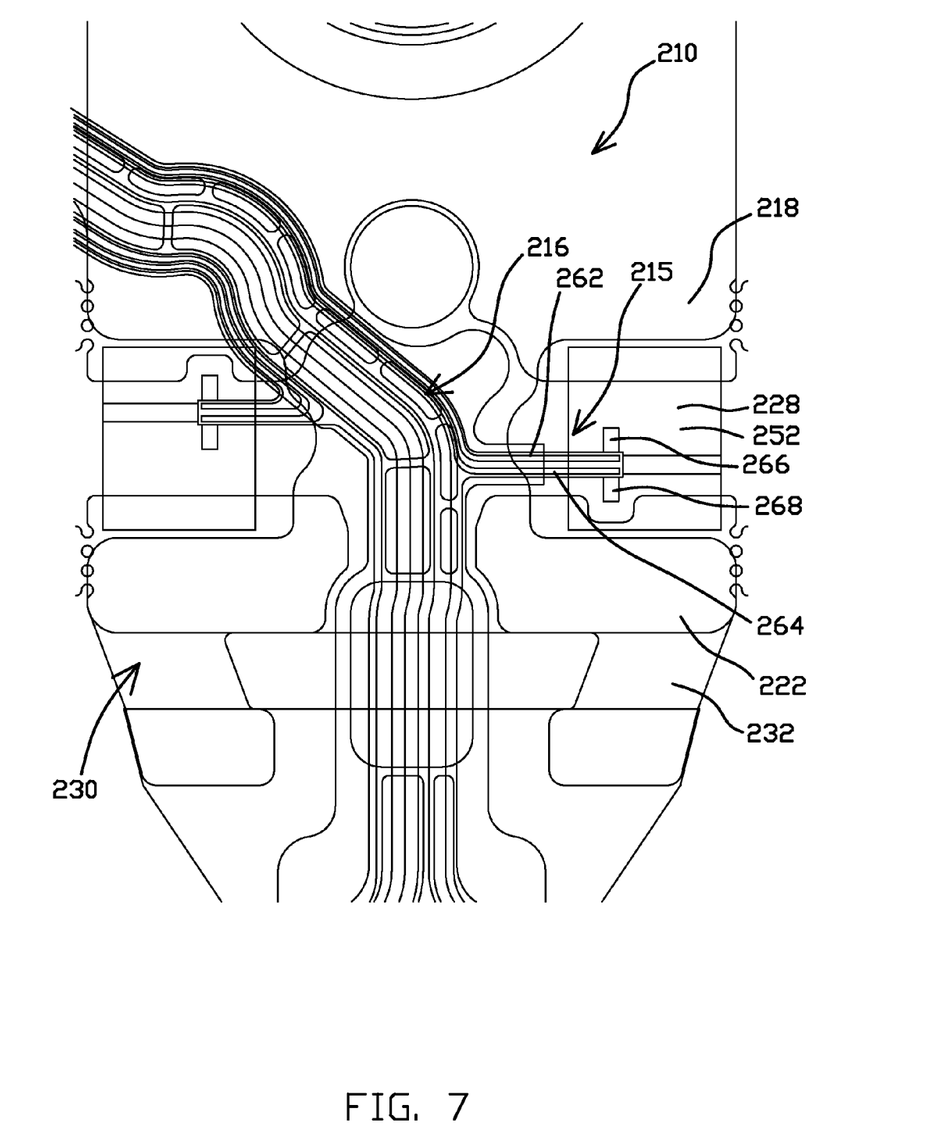
FIG. 7 is a detailed flexure-side illustration of a DSA structure of a suspension in accordance with another embodiment of the invention.
Figure 8:
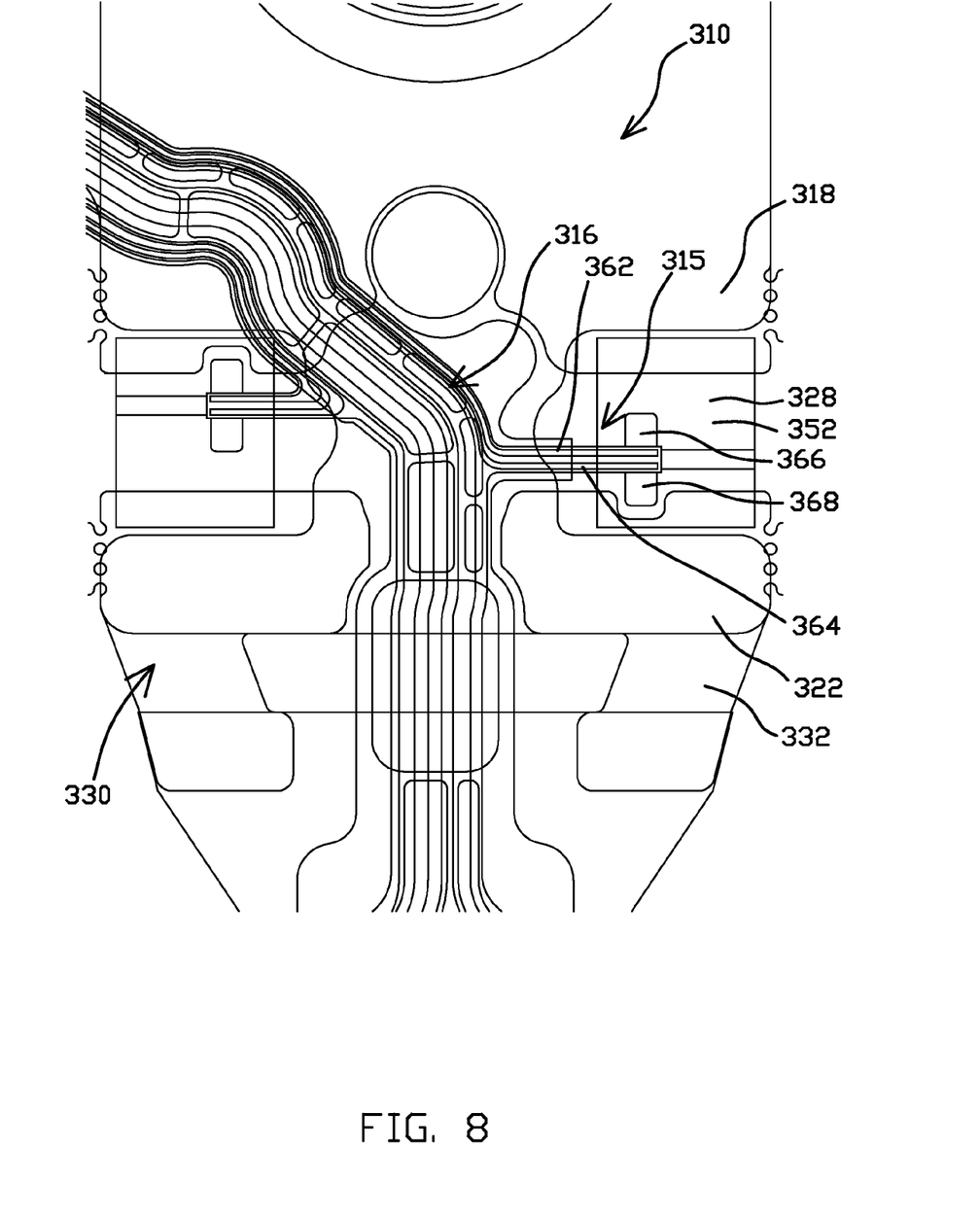
FIG. 8 is a detailed flexure-side illustration of a DSA structure of a suspension in accordance with another embodiment of the invention.
Figure 9:
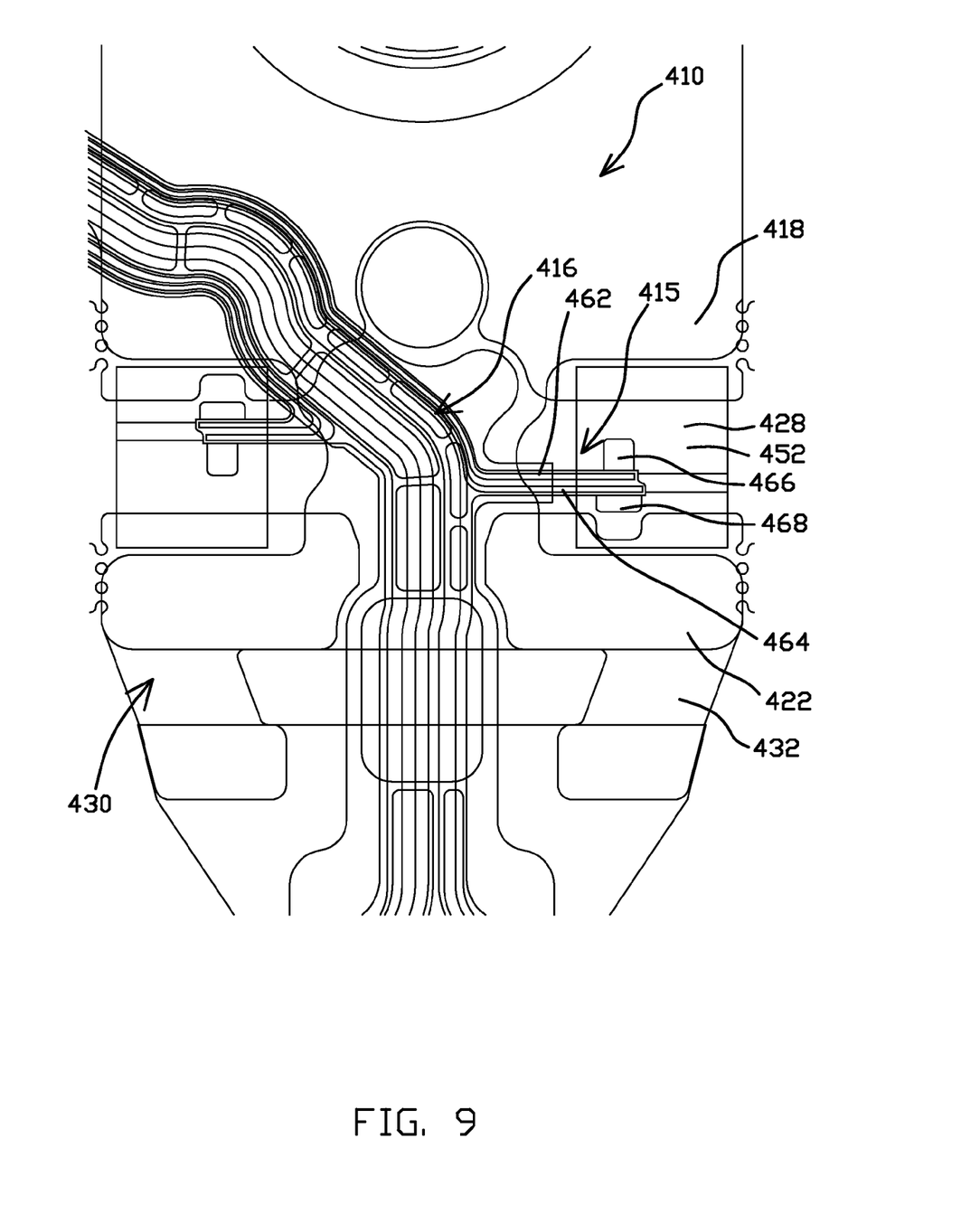
FIG. 9 is a detailed flexure-side illustration of a DSA structure of a suspension in accordance with another embodiment of the invention.
Figure 10:
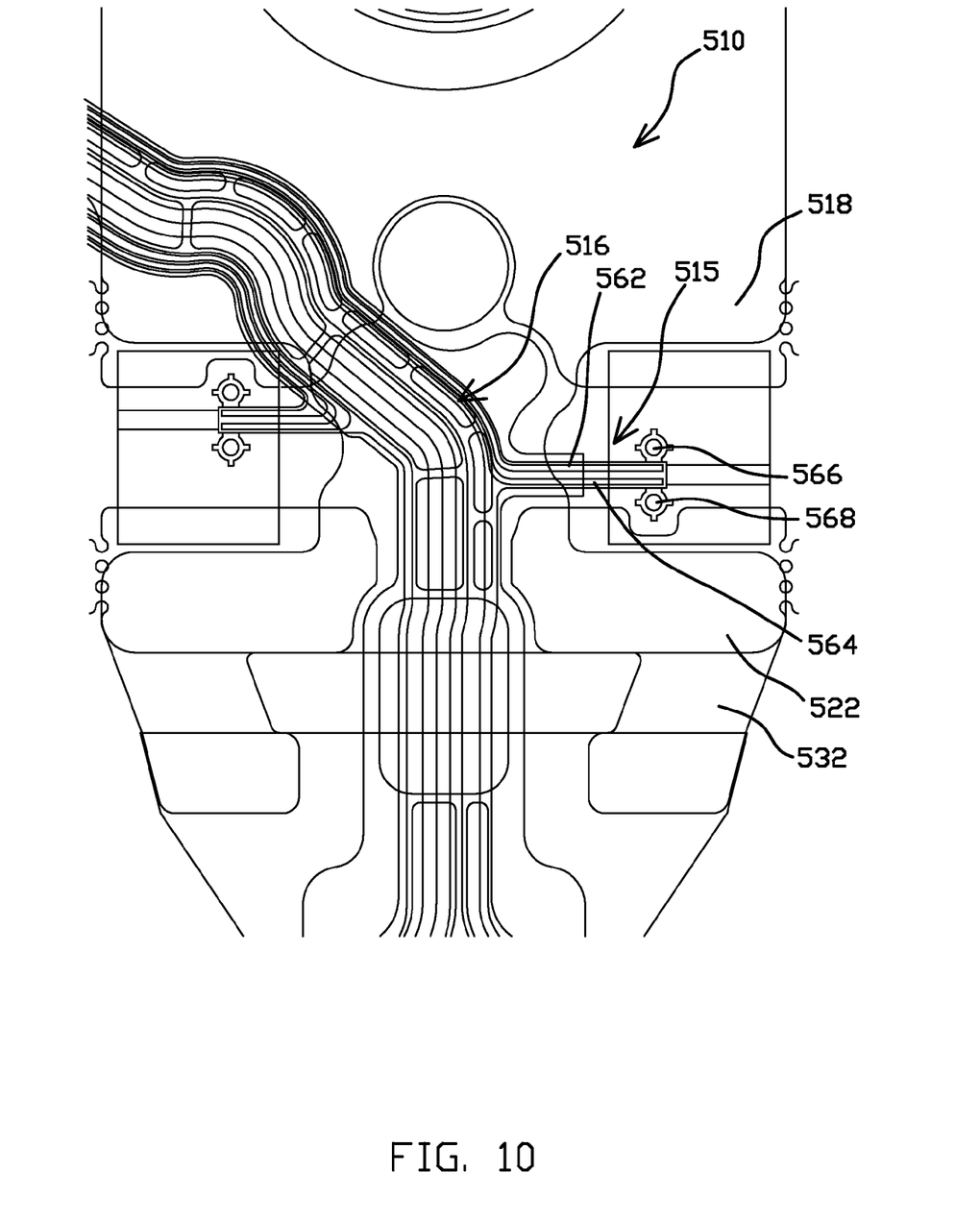
FIG. 10 is a detailed flexure-side illustration of a DSA structure of a suspension in accordance with another embodiment of the invention.

FIG. 6 is an illustration of the DSA structure of a suspension 110 in accordance with another embodiment of the invention. As shown, conductive epoxy 113 extends over a side edge of the PZT motor 128 to interconnect the electrode 154 to the terminal 158 on the other side of the motor.

FIGS. 7-10 are detailed flexure-side illustrations of the DSA structures of suspensions 210, 310, 410 and 510 in accordance with yet additional embodiments of the invention, showing alternative flexure trace paddle structures 215, 315, 415 and 515, respectively, for electrical connection to the PZT motor terminal.

Figure 11:
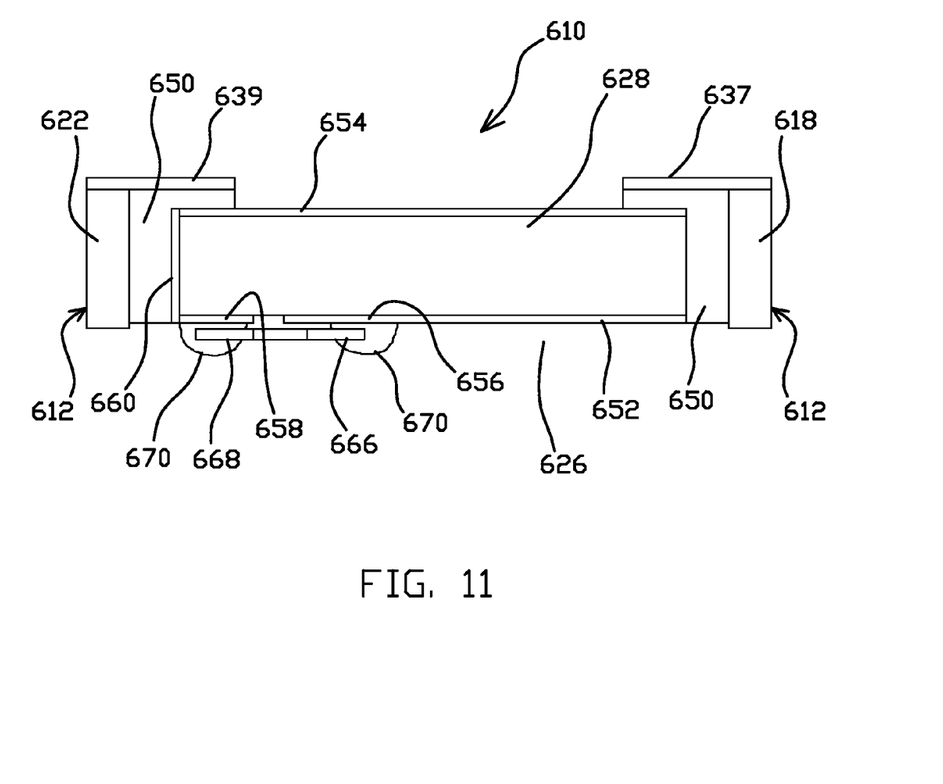
FIG. 11 is a detailed side edge view of a DSA structure of a suspension in accordance with another embodiment of the invention.

FIG. 11 is a detailed side view of the DSA structure of a suspension 610 in accordance with another embodiment of the invention. As shown, in suspension 610 the PZT motor 628 is mounted (by e.g., non-conductive epoxy 650) to the mounting/base plate 612 with the motor terminals 656 and 658 located on the side opposite the shelves that extend from the mounting/base plate into the PZT opening 626. In this embodiment of the invention the shelf on the proximal end 618 of the mounting/base plate 612 is formed by a layer of stainless steel 637 that is separate from the load beam (not shown) and welded or otherwise attached to the mounting/base plate. Similarly, the shelf on the distal end 618 of the mounting/base plate 612 is formed by a layer of stainless steel 639 that is welded or otherwise attached to the mounting/base plate. In yet other embodiments (not shown) the shelves can be formed in the material of the mounting/base plate or from a common piece of stainless steel. An advantage of suspension 610 configured with the PZT motor mounting shelves on the side of the motor opposite the motor terminals is that it can reduce or eliminate shelf-PZT clearance issues.

Although the invention has been described with reference to preferred embodiments, those skilled in the art will recognize that changes can be made in form and detail without departing from the spirit and scope of the invention.

What is claimed is:

1. A dual stage actuated disk drive head suspension including:

first and second portions connected by a linkage;

at least one PZT motor having first and second opposite sides, first and second electrodes on the first and second sides respectively, first and second terminals on the first side, and an electrical contact extending from the second electrode on the second side to the second terminal on the first side, the motor mounted to the first and second portions;

a flexure having at least first and second differential drive signal traces electrically connected to the first and second electrodes on the PZT motor, to couple differential electrical drive signals to the PZT motor, wherein the first and second drive signal traces include terminals, the first side of the PZT motor faces the flexure, and the PZT motor drives the first and second portions of the suspension with respect to one another in response to the drive signals; and shelves extending from the first and second portions, the PZT motor mounted to the shelves, wherein the terminals of the drive signal traces are respectively electrically connected to the first and second terminals of the PZT motor.

2. The head suspension of claim 1 wherein the first and second electrodes of the at least one PZT motor are electrically isolated from the first and second mounting portions.

3. The head suspension of claim 2 wherein the at least one PZT motor is adhesively mounted to the first and second portions by non-conductive adhesive.

4. The head suspension of claim 1 wherein the electrical contact extending from the electrode on the second side of the motor to the terminal on the first side of the motor includes conductive plating.

5. The head suspension of claim 1 wherein the PZT motor is mounted to the first and second portions with the PZT motor terminals on the same side of the suspension as the shelves.

6. The head suspension of claim 1 wherein the PZT motor is mounted to the first and second portions with the PZT motor terminals on the opposite side of the suspension as the shelves.

7. The head suspension of claim 1 and further including:
a second PZT motor having electrodes; and
third and fourth differential drive signal traces electrically connected to the electrodes of the second PZT motor.

8. The head suspension of claim 1 wherein the first and second portions connected by a linkage includes a mounting plate or base plate having proximal and distal portions connected by the linkage.

9. A dual stage actuated disk drive head suspension including:
a member having first and second portions connected by a linkage;
one or more PZT motors, each having first and second electrodes, first and second opposite sides, and first and second terminals electrically connected to the first and second electrodes respectively, wherein the first and second terminals are both on the first side of the motor;
shelves extending from the first and second portions;
adhesive securing each PZT motor to the shelves, and wherein the electrodes of each motor are electrically isolated from the member; and
a flexure having one or more sets of first and second differential drive signal traces electrically connected to the first and second terminals respectively, each drive signal trace electrically connected to a respective one of the PZT motor electrodes to couple differential electrical drive signals to the PZT motor, wherein the first side of each PZT motor faces the flexure, and each PZT motor drives the first and second portions of the suspension with respect to one another in response to the drive signals.

10. The head suspension of claim 9 wherein the adhesive is non-conductive adhesive.

11. The head suspension of claim 9, wherein the first and second electrodes are on the first and second sides of the motor, respectively.

12. The head suspension of claim 11, further comprising an electrical contact extending from the second electrode on the second side to the second terminal on the first side to electrically connect the second electrode with the second terminal.

13. The head suspension of claim 12, wherein the electrical contact comprises conductive plating on the one or more PZT motors.

14. The head suspension of claim 9, wherein the one or more PZT motors comprises two PZT motors.

15. The head suspension of claim 14, wherein the one or more sets of first and second differential drive signal traces comprises two sets of first and second differential drive signal traces, the two sets respectively associated with the two PZT motors.

16. The head suspension of claim 9, wherein the first and second portions include a mounting plate or base plate having proximal and distal portions connected by the linkage.

17. A dual stage actuated disk drive head suspension including:
a member having first and second portions connected by a linkage;
one or more PZT motors, each PZT motor respectively having first and second electrodes, first and second sides, first and second terminals electrically connected to the first and second electrodes respectively, and an electrical contact, wherein the first and second terminals are both on the first side of the motor, the electrical contact extends from the second electrode on the second side to the second terminal on the first side to electrically connect the second electrode with the second terminal, and the first and second electrodes are electrically isolated from the member;
shelves attached to the first and second portions, wherein each of the one or more PZT motors is mounted to a respective pair of the shelves; and
a flexure having one or more sets of first and second differential drive signal traces respectively electrically connected to the first and second terminals of a respective one of the one or more PZT motors to couple differential electrical drive signals to the one or more PZT motors, wherein the first side of each of the one or more PZT motors faces the flexure, and each of the one or more PZT motors drives the first and second portions with respect to one another in response to the drive signals.

18. The head suspension of claim 17, wherein the electrical contact comprises conductive plating on the one or more PZT motors.

19. The head suspension of claim 17, wherein:
the one or more PZT motors comprises two PZT motors, and
the one or more sets of first and second differential drive signal traces comprises two sets of first and second differential drive signal traces, the two sets respectively associated with the two PZT motors.

20. The head suspension of claim 17, wherein the first and second portions include a mounting plate or base plate having proximal and distal portions connected by the linkage.

* * * * *

UNITED STATES PATENT AND TRADEMARK OFFICE
CERTIFICATE OF CORRECTION

| | | |
|---|---|---|
| PATENT NO. | : 8,717,713 B1 | Page 1 of 1 |
| APPLICATION NO. | : 13/279814 | |
| DATED | : May 6, 2014 | |
| INVENTOR(S) | : Jacob D. Bjorstrom et al. | |

It is certified that error appears in the above-identified patent and that said Letters Patent is hereby corrected as shown below:

On the Title page, in the Inventors Item (75), Zachary D. Pokornowski should read
--Zachary A. Pokornowski--

Signed and Sealed this
Twenty-third Day of September, 2014

Michelle K. Lee
*Deputy Director of the United States Patent and Trademark Office*